DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 9, 1971

884 O.G. 433

T884,005

FOIL-FOAM LAMINAR STRUCTURES

Leon Edward Wolinski, Buffalo, N.Y., assignor to E. I. du Pont de Nemours and Company, Wilmington, Del.

Filed May 1, 1970, Ser. No. 33,913

Int. Cl. B32b *3/12*

U.S. Cl. 161—161

No Drawing. 13 Pages Specification

A laminar structure comprising a core of oriented closed cell styrene polymer foam of specific elongation and tensile modulus having thermoformable thermoplastic film and metal foil bonded to a first and second surface of the core, respectively.